Patented Oct. 13, 1953

2,655,545

UNITED STATES PATENT OFFICE 2,655,545

MANUFACTURE OF α,α-DIMETHYLBENZYL-HYDROPEROXIDE

Eberhard Brüning, Leverkusen-Bayerwerk, Detlef Delfs, Leverkusen, and Georg Spielberger, Leverkusen-Bayerwerk, Germany, assignors to Farbenfabriken Bayer, Leverkusen, Germany No Drawing. Application March 3, 1951, Serial No. 213,806. In Germany March 3, 1950

11 Claims. (Cl. 260—610)

It is known in the art to oxydize isopropylbenzene by treatment with molecular oxygen in the presence of autoxidation catalysts. According to this process, however, only traces of α,α-dimethylbenzylhydroperoxide are obtained along with large amounts of undesired by-products or decomposition products of α,α-dimethylbenzylhydroperoxide. This process has been generally carried out in the presence of larger amounts of metallic catalysts. It is known that decomposition of α,α-dimethylbenzylhydroperoxide is promoted by the metals usually employed as oxidation catalysts.

It has been proposed, for instance, in German Patent 522,255, to oxidize benzene homologues having at least one side-chain with two or more carbon atoms, with oxygen in the presence of oxides of heavy metals. This process, however, principally gives rise to acetophenone and dimethylcarbinol or homologues thereof and does not produce peroxides. According to Hock and Lang, Berichte 77, page 257 (1944) α,α-dimethylbenzylhydroperoxide is obtained by passing oxygen through isopropylbenzene in the presence of ultraviolet light at 85° C. The poor yields obtained according to this process render it commercially unfavourable. Greater conversions to hydroperoxide are obtained by treating alkaline emulsions of isopropylbenzene in water with oxygen (cf. G. P. Armstrong, R. H. Hall, D. C. Quin, Nature, vol. 164, page 834 [1944]). The decomposition of the hydroperoxide according to that process is promoted by lead and copper.

It is an object of the present invention to provide an improved process for the production of α,α-dimethylbenzylhydroperoxide from isopropylbenzene.

A further object is to provide a method for the manufacture of α,α-dimethylbenzylhydroperoxide from isopropylbenzene in better yields.

It is still a further object of the present invention to provide a method for the manufacture of α,α-dimethylbenzylhydroperoxide from isopropylbenzene whereby only small and negligible quantities of undesired by-products are formed.

Other objects will become apparent from the following description.

In accordance with the present invention, it has surprisingly been found that α,α-dimethylbenzylhydroperoxide is obtained in a good yield without the formation of appreciable amounts of by-products by treating isoprepylbenzene with molecular oxygen or oxygen-containing gases at elevated temperatures not exceeding the boiling temperature of the isopropylbenzene, preferably between 65 and 115° C. in the presence of transition metals, the concentration of the dissolved portion of the metal applied not exceeding that concentration of the same catalyst which decomposes $\frac{1}{10}$ of the perixode content of a mixture of 15 parts by weight of α,α-dimethylbenzylhydroperoxide and 85 parts by weight of isopropylbenzene at a temperature of 80° C. within 45 hours. It is of advantage to stir and mix the reaction mixture vigorously so that during the reaction sufficient amounts of oxygen are always present.

Transition metals are those which are capable of changing their valency and which catalyze the autoxidation of organic compounds. As such may be mentioned iron, cobalt, nickel, copper, lanthanum, lead, thallium, cerium, and manganese. Cerium has proved to be especially suitable according to the invention. The above-said metals are preferably applied in form of compounds being soluble or capable of being dispersed in isopropylbenzene, for instance, as naphthenates, stearates, palmitates and oleates, i. e. preferably compounds of weak acids forming soluble compounds in isopropylbenzene with the said metals. In general the anion does not influence the course of reaction. The application of naphthenates will be preferred according to the invention since the naphthenates are readily available and cheap. However, it is not absolutely necessary to employ the above-said readily soluble metal compounds but the difficultly soluble compounds of these metals, for instance, the oxides, may also be applied because they are partially dissolved under the reaction conditions, for instance, by slight amounts of acid compounds, thus effecting a catalytic influence. When applying difficultly soluble metal compounds the dissolved portion of the metal compound must likewise not exceed the above defined concentration. Of course, it is also possible to use mixtures of said metal compounds in the reaction.

In some cases, the application of the oxides may constitute a considerable advantage, for instance, when the reaction is accomplished in the presence of lead as catalyst. For instance, PbO, Pb$_2$O$_3$, Pb$_3$O$_4$, or PbO$_2$ as well as mixtures of these oxides may be employed. When carrying out the reaction with mixtures of these oxides the yields obtained are sometimes better than those obtained in a reaction accomplished with a homogeneous oxide. The amount of the metallic catalyst to be employed for carrying through the reaction differs according to the metal employed. For preventing the formation of appreciable quantities of by-products during oxidation the concentration of the metal catalyst dissolved in the reaction mixture shall not exceed that concentration of the same catalyst which decomposes $\frac{1}{10}$ of the peroxide content of a mixture of 15 parts by weight of α,α-dimethylbenzylhydroperoxide and 85 parts by weight of isopropylbenzene at a temperature of 80° C. within 45 hours. That concentration may be determined in simple manner by producing a solution of 15 parts by weight of pure α,α-dimethylbenzylhydroperoxide in 85 parts by weight of pure isopropylbenzene and mixing said solution in different vessels with the exclusion of air with increasing quantities of the metallic catalyst, allowing the mixture to stand at 80° C. and testing samples within definite periods as to the content of α,α-dimethylbenzylhydroperoxide left in the mixture.

In the following the concentrations are given with respect to some of the above-said transition metals effecting decomposition of 1/10 of the peroxide in a solution of 15 parts by weight of α,α-dimethylbenzylhydroperoxide and 85 parts by weight of isopropylbenzene within 45 hours at 80° C.:

| | Per cent |
|---|---|
| Cerium | 0.015 |
| Manganese | .0012 |
| Iron | .015 |
| Lead | .009 |
| Nickel | .015 |

The above figures are referred to isopropylbenzene.

The yields of α,α-dimethylbenzylhydroperoxide are increased with decreasing concentration of catalysts. The following figures are found when the reaction is carried out with manganese naphthenate within 3 hours:

| Percent by weight of manganese naphthenate (containing 8% by weight of manganese) referred to isopropylbenzene | Yield of α,α-dimethylbenzylhydroperoxide referred to the consumed oxygen, percent |
|---|---|
| 0.1 | 54 |
| .02 | 71 |
| .01 | 83 |
| .007 | 89 |
| .0053 | 94 |

The above figures are not reduced when extending the reaction to a longer period than 3 hours.

We have surprisingly found that the reduction of the catalyst concentration involves only a very slow decrease of the reaction velocity. For instance, a reaction solution containing 30% by weight of α,α-dimethylbenzylhydroperoxide may be prepared with 0.05% by weight of cerium naphthenate containing 21% by weight of cerium within 7 hours at 85° C. In this solution the reaction velocity is so high that still higher concentrated solutions of α,α-dimethylbenzylhydroperoxide are economically obtained on a large-scale production.

By reducing the concentration of the catalyst to a sufficient degree the yield of α,α-dimethylbenzylhydroperoxide referred to oxygen in some cases amounts to almost 100%. Despite this fact, when operating with such low concentrations, the reaction velocity still amounts to a multiple to that found in the oxidation of isopropylbenzene effected without catalysts.

A modification of the process according to the invention consists in starting the reaction with a metal catalyst the concentration of which is much lower than the maximum concentration defined above. In this case, the reaction velocity is gradually increased by periodically or continually adding further amounts of the metal catalyst.

In general, the reaction is instantaneous. In case, however, the reaction is not initiated at once, absorption of oxygen begins immediately after adding small amounts of α,α-dimethylbenzylhydroperoxide or a small amount of the hydroperoxide-containing oxidation mixture taken from a previous run or also other organic peroxides. The reaction may also be accomplished in the presence of indifferent diluents, for instance, benzene.

The amount of hydroperoxide formed per unit of time is reduced with increasing reaction time. It is therefore advisable to accomplish the reaction within a relatively short period and to return the unreacted isopropylbenzene to the process after separation of the hydroperoxide. The amount of peroxide formed per unit of time further depends on the rate of feeding oxygen to the activated isopropylbenzene molecule. The velocity can be increased, for instance, by vigorously agitating the reaction mixture with high-speed stirrers or carrying through the reaction by a continuous method in appropriate reaction vessels whereby it may be of advantage to dry the circulating oxygen.

The process according to the present invention permits of producing α,α-dimethylbenzylhydroperoxide from isopropylbenzene in simple manner and in very good yield. The employment of the said transition metals as catalysts in concentrations not higher than defined above offers the special advantage that the formation of α,α-dimethylbenzylhydroperoxide is favourably influenced, thus shortening the reaction time to a material degree. Undesired by-products, such as acetophenone or dimethylphenylcarbinol and the like, are formed in the new process in negligible amounts only.

The present invention is further illustrated by the following examples without being restricted thereto, the parts being by weight, if not otherwise stated.

*Example 1*

360 parts of isopropylbenzene are treated with oxygen at 84–85° C. with the addition of one of the catalysts indicated in the table below. The unreacted oxygen is returned to the process after drying with calcium chloride. The isopropylbenzene is finally divided by vigorous stirring. The yields of α,α-dimethylbenzylhydroperoxide calculated on the consumed oxygen and the concentration of peroxide in the reaction solution after 6 hours for various catalyst concentrations are given in the following table.

| Metal catalyst | Percent by weight of the catalyst calculated on isopropylbenzene | Yield calculated on the consumed oxygen | Percent by weight of α,α-dimethylbenzylhydroperoxide in the reaction solution after 6 hours | Percent by weight of the metal contained in the catalyst |
|---|---|---|---|---|
| Manganese naphthenate | 0.07 | 88.5 | 25.4 | 8.2 |
|  | .0053 | 94.0 | 22.7 |  |
| Cerium naphthenate | .05 | 84.5 | 27.3 | 21.0 |
|  | .02 | 91.5 | 19.0 |  |
| Copper naphthenate | .02 | 82.0 | 21.0 | 9.6 |
| Lead naphthenate | .01 | 100.0 | 0.5 | 28.5 |
| Cerium naphthenate: |  |  |  |  |
| at 92° C | .05 | 81.0 | 33.0 | 21.0 |
| at 100° C | .01 | 96.0 | 17.5 |  |
|  | .07 | 89.5 | 22.7 |  |
| Iron naphthenate | .1 | 88.0 | 25.0 | 6.4 |
|  | .2 | 80.0 | 27.8 |  |
| Nickel naphthenate | .07 | 98.0 | 13.8 | 8.0 |

*Example 2*

Oxygen is blown through a frit provided at the bottom of a reaction vessel of 55 mm. diameter and 900 mm. height, said reaction vessel being charged with 1100 grams of isopropylbenzene in which 320 mg. of cerium naphthenate containing 17% by weight of cerium are dissolved. The reaction temperature is kept at 80–82° C. The passage of oxygen which is circulated amounts to about 6–10 liters per hour. When the content of peroxide in the reaction solution has been increased to 22%, 100–130 grams of fresh isopropylbenzene containing 0.03% by weight of cerium naphthenate are fed into the reaction vessel and an equal amount of the reaction mixture is discharged through an overflow. The continually removed reaction mixture contains about 22–22.5% by weight of $\alpha,\alpha$-dimethylbenzylhydroperoxide which is obtained in a yield of 92% of the theoretical calculated on the consumed oxygen.

*Example 3*

A mixture of 360 parts of isopropylbenzene and 50 parts of benzene is treated with oxygen at 84–85° C. with the addition of 0.18 part of cerium naphthenate containing 21% by weight of cerium. The yield of $\alpha,\alpha$-dimethylbenzylhydroperoxide calculated on the consumed oxygen after a reaction time of 6 hours amounts to 86.5%. The concentration of the peroxide in the reaction solution after 6 hours is 18% by weight.

*Example 4*

A mixture of 360 parts of isopropylbenzene, 0.36 part of lead oxide and 10 parts of $\alpha,\alpha$-dimethylbenzylhydroperoxide in 100 parts of isopropylbenzene is heated to 85° C. with vigorous stirring. After passing through oxygen for 3 hours the reaction mixture contains 57 parts of $\alpha,\alpha$-dimethylbenzylhydroperoxide corresponding to 12.5% of the theoretical.

*Example 5*

0.35 part of lead dioxide is suspended in 360 parts of isopropylbenzene. The suspension is subsequently heated to 85° C. with vigorous stirring and a vigorous flow of oxygen is passed through for 3 hours. The reaction mixture contains 58.5 parts of $\alpha,\alpha$-dimethylbenzylhydroperoxide corresponding to 13% of the theoretical.

By replacing in the above reaction the lead dioxide by a mixture of 0.72 part of lead oxide and 0.36 part of lead dioxide 72.1 parts of $\alpha,\alpha$-dimethylbenzylhydroperoxide corresponding to 15.8% of the theoretical are obtained.

We claim:

1. A process for the manufacture of $\alpha,\alpha$-dimethylbenzylhydroperoxide which comprises reacting isopropylbenzene with molecular oxygen at elevated temperatures not exceeding the boiling temperature of the isopropylbenzene, in the presence of a transition metal, the concentration of said transition metal dissolved in the reaction mixture not exceeding that concentration of the same catalyst which decomposes $\frac{1}{10}$ of the peroxide content of a mixture of 15 parts by weight of $\alpha,\alpha$-dimethylbenzylhydroperoxide and 85 parts by weight of isopropylbenzene at a temperature of 80° C. within 45 hours.

2. A process for the manufacture of $\alpha,\alpha$-dimethylbenzylhydroperoxide which comprises reacting isopropylbenzene with molecular oxygen at a temperature between 65° C. and 115° C. in the presence of a transition metal, the concentration of said transition metal dissolved in the reaction mixture not exceeding that concentration of the same catalyst which decomposes $\frac{1}{10}$ of the peroxide content of a mixture of 15 parts by weight of $\alpha,\alpha$-dimethylbenzylhydroperoxide and 85 parts by weight of isopropylbenzene at a temperature of 80° C. within 45 hours.

3. A process for the manufacture of $\alpha,\alpha$-dimethylbenzylhydroperoxide which comprises reacting isopropylbenzene with molecular oxygen at a temperature between 65° C. and 115° C. in the presence of a transition metal, said transition metal being applied in form of a compound being soluble in isopropylbenzene, the concentration of said transition metal dissolved in the reaction mixture not exceeding that concentration of the same catalyst which decomposes $\frac{1}{10}$ of the peroxide content of a mixture of 15 parts by weight of $\alpha,\alpha$-dimethylbenzylhydroperoxide and 85 parts by weight of isopropylbenzene at a temperature of 80° C. within 45 hours.

4. A process for the manufacture of $\alpha,\alpha$-dimethylbenzylhydroperoxide which comprises reacting isopropylbenzene with molecular oxygen at a temperature between 65° C. and 115° C. in the presence of a transition metal, said transition metal being applied in form of a compound being soluble in isopropylbenzene, the concentration of said transition metal dissolved in the reaction mixture not exceeding that concentration of the same catalyst which decomposes $\frac{1}{10}$ of the peroxide content of a mixture of 15 parts by weight of $\alpha,\alpha$-dimethylbenzylhydroperoxide and 85 parts by weight of isopropylbenzene at a temperature of 80° C. within 45 hours, part of said transition metal compound being added to the reaction mixture at the beginning of the reaction and the rest being added in portions during the course of the reaction.

5. A process for the manufacture of $\alpha,\alpha$-dimethylbenzylhydroperoxide which comprises reacting isopropylbenzene with molecular oxygen at a temperature between 65° C. and 115° C. with the addition of small quantities of an organic peroxide at the beginning of the reaction and in the presence of a transition metal, said transition metal being applied in form of a compound being soluble in isopropylbenzene, the concentration of said transition metal dissolved in the reaction mixture not exceeding that concentration of the same catalyst which decomposes $\frac{1}{10}$ of the peroxide content of a mixture of 15 parts by weight of $\alpha,\alpha$-dimethylbenzylhydroperoxide and 85 parts by weight of isopropylbenzene at a temperature of 80° C. within 45 hours, part of said transition metal compound being added to the reaction mixture at the beginning of the reaction and the rest being added in portions during the course of the reaction.

6. A process for the manufacture of $\alpha,\alpha$-dimethylbenzylhydroperoxide which comprises reacting isopropylbenzene with molecular oxygen at a temperature between 65° C. and 115° C. with the addition of small quantities of $\alpha,\alpha$-dimethylbenzylhydroperoxide at the beginning of the reaction and in the presence of a transition metal, said transition metal being applied in the form of a compound being soluble in isopropylbenzene, the concentration of said transition metal dissolved in the reaction mixture not exceeding that concentration of the same catalyst which decomposes $\frac{1}{10}$ of the peroxide content of a mixture of 15 parts by weight of $\alpha,\alpha$-dimethylbenzylhydroperoxide and 85 parts by weight of isopropylbenzene at a temperature of 80° C. within 45 hours, part of said transition metal compound being added to the reaction mixture at the beginning of the reaction and the rest being added in portions during the course of the reaction.

7. A process for the manufacture of α,α-dimethylbenzylhydroperoxide which comprises reacting isopropylbenzene with molecular oxygen at a temperature between 65° C. and 115° C. in the presence of a soluble compound of manganese, the concentration of the manganese metal dissolved in the reaction mixture not exceeding about 0.0012% by weight.

8. A process for the manufacture of α,α-dimethylbenzylhydroperoxide which comprises reacting isopropylbenzene with molecular oxygen at a temperature between 65° C. and 115° C. in the presence of a soluble compound of cerium, the concentration of the cerium metal dissolved in the reaction mixture not exceeding about 0.015% by weight.

9. A process for the manufacture of α,α-dimethylbenzylhydroperoxide which comprises reacting isopropylbenzene with molecular oxygen at a temperature between 65° C. and 115° C. in the presence of a soluble compound of iron, the concentration of the iron metal dissolved in the reaction mixture not exceeding about 0.015% by weight.

10. A process for the manufacture of α,α-dimethylbenzylhydroperoxide which comprises reacting isopropylbenzene with molecular oxygen at a temperature between 65° C. and 115° C. in the presence of a lead oxide, the concentration of the lead metal dissolved in the reaction mixture not exceeding about 0.009% by weight.

11. A process for the manufacture of α,α-dimethylbenzylhydroperoxide which comprises reacting isopropylbenzene with molecular oxygen at a temperature between 65° C. and 115° C. in the presence of a soluble compound of nickel, the concentration of the nickel metal dissolved in the reaction mixture not exceeding about 0.015% by weight.

EBERHARD BRÜNING.
DETLEF DELFS.
GEORG SPIELBERGER.

References Cited in the file of this patent

UNITED STATES PATENTS

| Number | Name | Date |
|---|---|---|
| 1,924,786 | Hartmann et al. | Aug. 29, 1933 |
| 2,547,938 | Hall et al. | Apr. 10, 1951 |
| 2,548,435 | Lorand et al. | Apr. 10, 1951 |

FOREIGN PATENTS

| Number | Country | Date |
|---|---|---|
| 610,293 | Great Britain | Oct. 13, 1948 |